US011606459B2

(12) United States Patent
Yang et al.

(10) Patent No.: US 11,606,459 B2
(45) Date of Patent: Mar. 14, 2023

(54) TERMINAL DEVICE, AND DSD AUDIO PLAYBACK CIRCUIT AND METHOD

(71) Applicant: Honor Device Co., Ltd., Guangdong (CN)

(72) Inventors: Xiao Yang, Beijing (CN); Fang-Ching Lee, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 207 days.

(21) Appl. No.: 16/961,462

(22) PCT Filed: Jan. 11, 2018

(86) PCT No.: PCT/CN2018/072292
§ 371 (c)(1),
(2) Date: Jul. 10, 2020

(87) PCT Pub. No.: WO2019/136675
PCT Pub. Date: Jul. 18, 2019

(65) Prior Publication Data
US 2021/0092221 A1  Mar. 25, 2021

(51) Int. Cl.
H04M 3/02 (2006.01)
H04R 3/00 (2006.01)
G06F 3/16 (2006.01)

(52) U.S. Cl.
CPC .............. H04M 3/02 (2013.01); G06F 3/165 (2013.01); H04R 3/00 (2013.01)

(58) Field of Classification Search
CPC ................ G06F 3/165; H04M 1/6016; H04M 1/6058; H04M 1/724; H04M 1/72442; H04M 3/02; H04R 3/00; H04W 88/02
(Continued)

(56) References Cited

U.S. PATENT DOCUMENTS 8,200,479 B2  6/2012  Sintes et al.
10,297,127 B1*  5/2019  Hardt .................. H04N 21/439
(Continued)

FOREIGN PATENT DOCUMENTS

CN  101508299 A  8/2009
CN  201465547 U  5/2010
(Continued)

OTHER PUBLICATIONS

Xiao Zhao, "Adaptive Hybrid Digital-nalog Video Transmission in Wireless Mobile Networks," University of Science and Technology of China A dissertation for master"s degree, May 2015, 73 pages. With an English Abstract.
(Continued)

Primary Examiner — Tan H Trinh
(74) Attorney, Agent, or Firm — Conley Rose, P.C.

(57) ABSTRACT

A terminal device includes a processor, a direct stream digital (DSD) audio playback circuit, and a headset jack. The processor is connected to the DSD audio playback circuit, and the DSD audio playback circuit is connected to the headset jack. The processor outputs a DSD audio signal to the DSD audio playback circuit in response to triggering performed by a user. The DSD audio playback circuit is configured to process the DSD audio signal, generate an alert tone based on a current scenario, and superpose the processed DSD audio signal and the alert tone. The headset jack is configured to connect to a headset and play the superposed audio signal and alert tone using the headset.

20 Claims, 13 Drawing Sheets

(58) Field of Classification Search
USPC ..... 455/425, 412.141, 4.3, 414.4, 41.1, 41.2
See application file for complete search history.

(56) References Cited

U.S. PATENT DOCUMENTS

| | | | |
|---|---|---|---|
| 2004/0213350 A1 | 10/2004 | Frith et al. | |
| 2005/0050321 A1* | 3/2005 | Murakoshi | H04L 63/08 713/165 |
| 2006/0094474 A1* | 5/2006 | Zatloukal | H04M 1/72442 455/572 |
| 2008/0144858 A1* | 6/2008 | Khawand | H04M 19/04 381/99 |
| 2010/0051576 A1* | 3/2010 | Tran | B65D 51/185 215/386 |
| 2012/0005380 A1* | 1/2012 | Batson | G06F 16/60 710/38 |
| 2013/0101125 A1* | 4/2013 | Peters | H04R 29/00 381/56 |
| 2014/0369512 A1* | 12/2014 | Slupeiks | H04R 3/00 381/59 |
| 2015/0178038 A1* | 6/2015 | Yliaho | G06F 1/1694 455/566 |
| 2017/0357474 A1* | 12/2017 | Ferris | G06F 13/4282 |
| 2019/0131946 A1* | 5/2019 | Prior | H04R 3/00 |
| 2019/0149165 A1* | 5/2019 | Finck | H03M 3/504 341/144 |
| 2020/0382130 A1* | 12/2020 | Tamori | H03M 1/504 |

FOREIGN PATENT DOCUMENTS

| | | |
|---|---|---|
| CN | 101834929 A | 9/2010 |
| CN | 204991149 U | 1/2016 |
| CN | 105868085 A | 8/2016 |
| CN | 105872899 A | 8/2016 |
| CN | 106205625 A | 12/2016 |
| CN | 106412767 A | 2/2017 |
| CN | 106504759 A | 3/2017 |
| CN | 107204191 A | 9/2017 |
| WO | 2004036939 A1 | 4/2004 |

OTHER PUBLICATIONS

Yasui, Y., et al., "Linear-phased Graphic Equalizer Applied to Direct Stream Digital Signal," 2015 IEEE 4th Global Conference on Consumer Electronics (GCCE), Date of Conference: Oct. 27-30, 2015, 2 pages.

* cited by examiner

TERMINAL DEVICE, AND DSD AUDIO PLAYBACK CIRCUIT AND METHOD

CROSS-REFERENCE TO RELATED APPLICATIONS

This application is a National Stage of International Patent Application No. PCT/CN2018/072292 filed on Jan. 11, 2018, which is hereby incorporated by reference in its entirety.

TECHNICAL FIELD

Embodiments of the present invention relate to the field of electronic technologies, and in particular, to a terminal device, and a direct stream digital (direct stream digital, DSD) audio playback circuit and method.

BACKGROUND

DSD is a high-definition digital audio format with super high sound quality. When a DSD audio signal (namely, an audio signal in a DSD format) is played by using a terminal device such as a mobile phone, a delta-sigma digital-to-analog converter (digital to analog converter, DAC) chip supporting DSD decoding usually needs to be disposed in the terminal device. The DSD decoding refers to converting the DSD audio signal into an analog audio signal.

FIG. 1 is a schematic structural diagram of a terminal device. The terminal device may be configured to play a DSD audio signal. Referring to FIG. 1, the terminal device may include a processor, a DAC chip, a headset jack, and the like. The processor is a controller of the terminal device, and the DAC chip supports DSD decoding. The processor is connected to the DAC chip by using an I2C (inter integrated circuit) bus and an inter-IC sound (inter-IC sound, I2S) bus. The processor reads and controls a working status of the DAC chip by using the I2C bus. When the terminal device plays the DSD audio signal, the processor outputs the DSD audio signal to the DAC chip by using the I2S based on a DoP (DSD over PCM) protocol. PCM is short for pulse code modulation (pulse code modulation) in English. The DAC chip converts the DSD audio signal into an analog audio signal, and outputs the analog audio signal to the headset jack. The headset jack is configured to connect to a headset, and the terminal device plays the analog audio signal by using the headset.

Referring to FIG. 1, when the terminal device plays the DSD audio signal, because the I2S is occupied by the DSD audio signal, the processor cannot retransmit another audio signal to the DAC chip. Consequently, a user may miss some information, such as an incoming call, because the user cannot hear the another audio signal.

SUMMARY

Embodiments of the present invention provide a terminal device, and a DSD audio playback circuit and method, to help output an alert tone when a DSD audio signal is played.

According to a first aspect, a terminal device is provided. The terminal device may include a processor, a DSD audio playback circuit, and a headset jack. The processor is connected to the DSD audio playback circuit, and the DSD audio playback circuit is connected to the headset jack. The processor outputs a DSD audio signal to the DSD audio playback circuit in response to triggering performed by a user. The DSD audio playback circuit is configured to: process the DSD audio signal; generate an alert tone based on a current scenario; and superpose the processed DSD audio signal and the alert tone. The headset jack is configured to connect to a headset, to play the superposed audio signal and alert tone by using the headset. The processor may be an application processor, but certainly, is not limited thereto. The DSD audio playback circuit may be a chip that supports DSD decoding, for example, a DAC chip. In the technical solution, the terminal device superposes the alert tone and the processed DSD audio signal by using the DSD audio playback circuit, and plays, by using the headset, a signal obtained after the superposition, to output the alert tone when the DSD audio signal is played. The current scenario is a scenario in which there is a current alert tone playback requirement.

In a possible design, the processor may be further configured to determine alert tone control information corresponding to the current scenario. The current scenario is a scenario in which there is the alert tone playback requirement. For example, the current scenario includes at least one of the following scenarios: incoming of a call, receiving of an SMS message, receiving of a WeChat message, receiving of a QQ message, and insufficient power. Optionally, the alert tone control information may include at least one of a frequency, a volume, a generation period, single playback duration, and a total quantity of playbacks that are of the alert tone.

In a possible design, the DSD audio playback circuit may be configured to generate the alert tone based on the alert tone control information corresponding to the current scenario. In the possible design, the DSD audio playback circuit may generate the alert tone under control of the processor. Certainly, this application is not limited thereto. For details, refer to the following specific embodiments.

In a possible design, the DSD audio playback circuit includes a digital-to-analog converter and an alert tone output circuit. The digital-to-analog converter is configured to perform digital-to-analog conversion on the DSD audio signal, to obtain an analog audio signal. The alert tone output circuit includes a control unit, a generation unit, and a superposition unit. The generation unit generates, under control of the control unit, the alert tone based on a reference signal and the alert tone control information corresponding to the current scenario; and the superposition unit is configured to superpose the analog audio signal and the alert tone. The possible design provides a specific implementation of the DSD audio playback circuit. Certainly, this application is not limited thereto.

In a possible design, that the processor is further configured to determine alert tone control information corresponding to the current scenario may be specifically as follows: the processor is further configured to determine, based on a correspondence between a preset scenario and alert tone control information, the alert tone control information corresponding to the current scenario. Optionally, the preset scenario includes at least one of the following scenarios: incoming of a call, receiving of an SMS message, receiving of a WeChat message, receiving of a QQ message, and insufficient power. The current scenario is one of preset scenarios. Optionally, the preset scenario and the alert tone control information are stored in a nonvolatile memory. In the possible design, different alert tone control information may be set for different preset scenarios, to help the user identify the current scenario based on the alert tone.

According to a second aspect, a terminal device is provided. The terminal device may include a processor, a DSD audio playback circuit, and a headset jack. The processor is connected to the DSD audio playback circuit, and the DSD audio playback circuit is connected to the headset jack. The processor is configured to: output a DSD audio signal to the DSD audio playback circuit in response to triggering performed by a user; and determine alert tone control information corresponding to a current scenario. The DSD audio playback circuit is configured to: process the DSD audio signal; generate an alert tone based on the alert tone control information corresponding to the current scenario; and superpose the processed DSD audio signal and the alert tone. The headset jack is configured to connect to a headset, to play the superposed audio signal and alert tone by using the headset. For example, the processor may be an application processor. The DSD audio playback circuit may be a chip that supports DSD decoding, for example, a DAC chip.

In a possible design, the DSD audio playback circuit includes a digital-to-analog converter and an alert tone output circuit. The digital-to-analog converter is configured to perform digital-to-analog conversion on the DSD audio signal, to obtain an analog audio signal. The alert tone output circuit includes a control unit, a generation unit, and a superposition unit. The generation unit generates, under control of the control unit, the alert tone based on a reference signal and the alert tone control information corresponding to the current scenario. The superposition unit is configured to superpose the analog audio signal and the alert tone.

In a possible design, that the processor is configured to determine alert tone control information corresponding to a current scenario may be specifically as follows: the processor is configured to determine, based on a correspondence between a preset scenario and alert tone control information, the alert tone control information corresponding to the current scenario.

According to a third aspect, a DSD audio playback circuit is provided. The DSD audio playback circuit may include a digital-to-analog converter and an alert tone output circuit. The digital-to-analog converter is connected to the alert tone output circuit. The digital-to-analog converter is configured to perform digital-to-analog conversion on a DSD audio signal, to obtain an analog audio signal. The alert tone output circuit is configured to: generate an alert tone based on a current scenario, and superpose the analog audio signal and the alert tone. The superposed analog audio signal and alert tone are played by using a headset connected to a headset jack.

In a possible design, the alert tone output circuit is specifically configured to generate the alert tone based on alert tone control information corresponding to the current scenario.

In a possible design, the alert tone output circuit may include a control unit, a generation unit, and a superposition unit. The generation unit generates, under control of the control unit, the alert tone based on a reference signal and the alert tone control information corresponding to the current scenario; and the superposition unit is configured to superpose the analog audio signal and the alert tone.

According to a fourth aspect, a DSD audio playback method is provided. The method may include: converting a DSD audio signal into an analog audio signal; generating an alert tone based on a current scenario; superposing the analog audio signal and the alert tone; and playing the superposed analog audio signal and alert tone by using a headset connected to a headset jack.

In a possible design, the method may further include: determining alert tone control information corresponding to the current scenario. In this case, the generating an alert tone based on a current scenario may include: generating the alert tone based on the alert tone control information corresponding to the current scenario.

In a possible design, the determining alert tone control information corresponding to the current scenario may include: determining, based on a correspondence between a preset scenario and alert tone control information, the alert tone control information corresponding to the current scenario.

For explanations of related content in any one of the second aspect to the fourth aspect, for example, for the preset scenario, the current scenario, and the alert tone control information, refer to the first aspect. Details are not described herein again.

In a possible design, an embodiment of the present invention further provides a terminal device. The terminal device may include a memory and a processor. The memory is configured to store a computer program, and when the computer program is executed by the processor, any method provided in the fourth aspect is performed.

In a possible design, an embodiment of the present invention further provides a computer readable storage medium. The computer readable storage medium stores a computer program, and when the computer program is run on a computer, any method provided in the fourth aspect is performed.

In a possible design, an embodiment of the present invention further provides a computer program product. When the computer program product is run on a computer, any method provided in the fourth aspect is performed.

In the foregoing possible designs, the current scenario is one of preset scenarios.

It may be understood that for beneficial effects of any one of the DSD audio playback circuit, the DSD audio playback method, the computer readable storage medium, the computer program product, or the like provided above, refer to the described beneficial effects of the terminal device provided above. Details are not described herein again.

DESCRIPTION OF EMBODIMENTS

The term "and/or" in the embodiments of this application is used to describe only an association relationship between associated objects and represents that three relationships may exist between the associated objects. For example, A and/or B represents the following three cases: Only A exists, both A and B exist, and only B exists. The symbol "/" represents an "or" relationship between associated objects. For example, A/B represents A or B. "First", "second", and the like are used to distinguish between different objects rather than describe a specific sequence of the objects. "A plurality of" refers to two or more than two.

It should be noted that because a DSD audio playback circuit provided in the embodiments of the present invention is included in a terminal device, all descriptions about embodiments of the DSD audio playback circuit are included in descriptions about embodiments of the terminal device. The following does not separately describe the embodiments of the DSD audio playback circuit.

Figure 1:
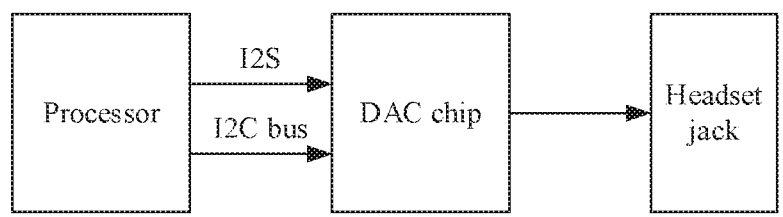
FIG. 1 is a schematic structural diagram of a terminal device in the prior art.
Figure 2:
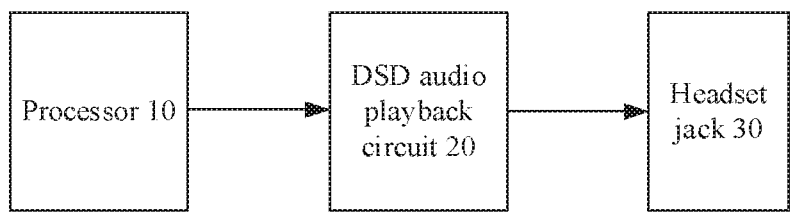
FIG. 2 is a schematic structural diagram 1 of a terminal device according to an embodiment of the present invention.

FIG. 2 is a schematic structural diagram of a terminal device according to an embodiment of the present invention. The terminal device may be a mobile phone, a tablet computer, a wearable device, smart glasses, or the like. The terminal device may include a processor 10, a DSD audio playback circuit 20, and a headset jack 30. The processor 10 is connected to the DSD audio playback circuit 20, and the DSD audio playback circuit 20 is connected to the headset jack 30. The processor 10 may be an application processor (application processor, AP), or certainly, may be another processor. This is not limited in this embodiment of the present invention. The DSD audio playback circuit 20 may be a chip that supports DSD decoding, for example, a DAC chip.

The processor 10 outputs a DSD audio signal to the DSD audio playback circuit 20 in response to triggering performed by a user. For example, when determining that the user triggers playing of an audio file in a DSD format, the processor 10 outputs the DSD audio signal to the DSD audio playback circuit 20 in response to triggering performed by the user.

The DSD audio playback circuit 20 is configured to: process the DSD audio signal; generate an alert tone based on a current scenario; and superpose the alert tone and the processed DSD audio signal.

The headset jack 30 is configured to connect to a headset, to play the superposed audio signal and alert tone by using the headset.

The current scenario is a scenario in which there is a current alert tone playback requirement. The current scenario may be at least one of the following scenarios: incoming of a call, receiving of an SMS message, receiving of a WeChat message, receiving of a QQ message, or insufficient power.

It may be understood that, when the processor identifies that the current scenario is a scenario in which an alert tone needs to be played, the DSD audio playback circuit generates a preset alert tone based on the current scenario. There may be a plurality of scenarios in which an alert tone needs to be played, for example, scenarios of an incoming call, receiving of an SMS message, receiving of a WeChat message, and insufficient power. These scenarios may correspond to one alert tone, that is, alert tones are the same. Certainly, these scenarios may alternatively correspond to different alert tones, that is, one scenario corresponds to one alert tone. A plurality of these scenarios may correspond to one alert tone. For example, incoming of a call, receiving of an SMS message, and receiving of a WeChat message correspond to one alert tone. Insufficient power corresponds to another alert tone.

The alert tone may be a single-frequency alert tone with a frequency. For example, a frequency of the alert tone is $f1$. In addition, the alert tone may alternatively be a multi-frequency alert tone obtained by superposing a plurality of sub-alert tones with different frequencies. For example, the alert tone may be a dual-frequency alert tone obtained by superposing two sub-alert tones with a frequency $f2$ and a frequency $f3$, or certainly, may be a tri-frequency alert tone (a tri-frequency alert tone obtained by superposing three sub-alert tones with a frequency $f4$, a frequency $f5$, and a frequency $f6$). A value range of the frequency of the single-frequency alert tone and a value range of a frequency of any sub-alert tone each may be 20 Hz to 20,000 Hz. In addition, a frequency of the DSD audio signal usually changes within a frequency range (that is, a frequency band). For example, the frequency range may be 20 Hz to 20,000 Hz.

The superposing the alert tone and the processed DSD audio signal may be understood as follows: performing time domain summation on the alert tone and the processed DSD audio signal. For example, assuming that the frequency range of the DSD audio signal is 20 Hz to 20,000 Hz, and the alert tone is a single-frequency alert tone with a frequency of 200 Hz, the playing the superposed audio signal and alert tone may be as follows: playing both the audio signal in the frequency range of 20 Hz to 20,000 Hz and the alert tone with the frequency of 200 Hz.

In this embodiment, the terminal device processes the DSD audio signal and generates the alert tone based on the current scenario; and then superposes the alert tone and the processed DSD audio signal, and plays, by using the headset, a signal obtained after the superposition, to output the alert tone when the audio signal in the DSD format is played. The alert tone is usually a fixed-frequency audio signal, or an audio signal obtained after several fixed-frequency audio signals are superposed, but the frequency of the DSD audio signal usually changes within a frequency range (that is, a frequency band). Even if the frequency of the alert tone is the same as a frequency of the DSD audio signal at a moment, a frequency of the DSD audio signal at a next moment is usually different from the frequency of the alert tone. Therefore, after the alert tone and the DSD audio signal are superposed and output to the headset, the user can identify the alert tone when hearing the DSD audio signal.

Figure 3:
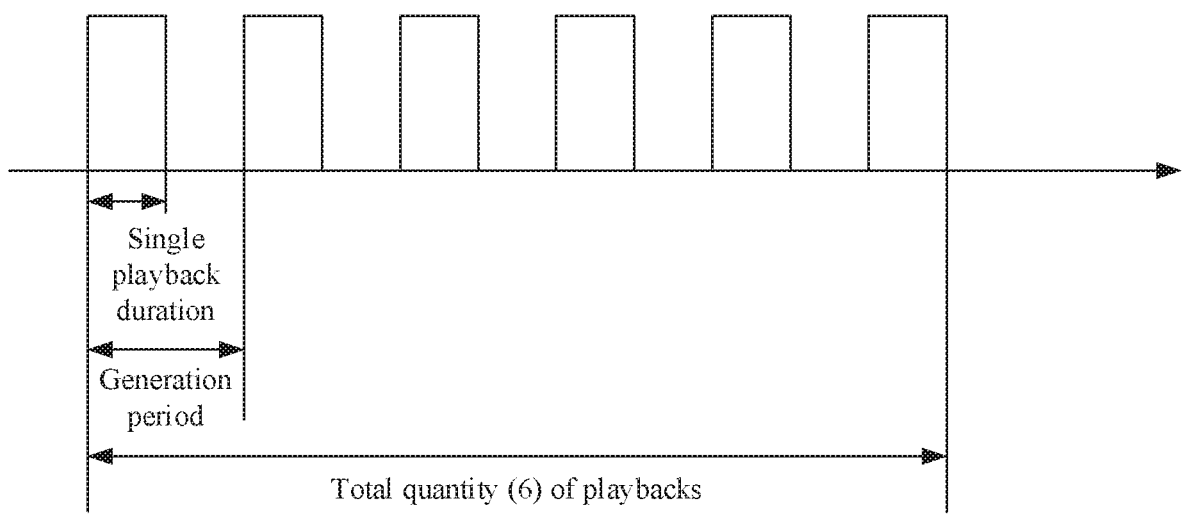
FIG. 3 is a schematic diagram of a relationship among a generation period, single playback duration, and a total quantity of playbacks that are of an alert tone according to an embodiment of the present invention.

In some embodiments of this application, the DSD audio playback circuit 20 may be configured to generate the alert tone based on alert tone control information corresponding to the current scenario. The alert tone control information is information used to control a parameter of the alert tone. The parameter of the alert tone may include but is not limited to a frequency, a generation period, a volume, a generation period, single playback duration, a total quantity of playbacks, and the like that are of the alert tone, and the alert tone control information may be one of the frequency, the generation period, the volume, the generation period, the single playback duration, and the total quantity of playbacks that are of the alert tone. The alert tone control information may alternatively be a plurality of, for example, two or three of the frequency, the generation period, the volume, the generation period, the single playback duration, and the total quantity of playbacks that are of the alert tone. The generation period is a time interval between two adjacent times of alert tone generation. The single playback duration is playback duration in one generation period. A relationship among the generation period, the single playback duration, and the total quantity of playbacks is shown in FIG. 3. In FIG. 3, the generation period of the alert tone is 1 s, the single playback duration is 0.5 s, and the total quantity of playbacks is 6. For an example of specific content of the alert tone control information, refer to the following descriptions.

In different scenarios in which there is the alert tone playback requirement, the alert tone control information may be the same or different. Based on this, in an implementation, a correspondence between a preset scenario and alert tone control information may be prestored in a nonvolatile memory of the terminal device. In this case, when determining the current scenario, the processor 10 may determine, based on the correspondence between a preset scenario and alert tone control information, the alert tone control information corresponding to the current scenario, and provide the alert tone control information corresponding to the current scenario for the DSD audio playback circuit 20. After receiving the alert tone control information corresponding to the current scenario, the DSD audio playback circuit 20 may generate the alert tone based on the alert tone control information corresponding to the current scenario.

The preset scenario is a preset scenario in which there is the alert tone playback requirement. The scenario may include but is not limited to a scenario such as incoming of a call, receiving of an SMS message, receiving of a WeChat message, receiving of a QQ message, or insufficient power. The scenario in which there is the alert tone playback requirement may be at least one of the following scenarios: incoming of a call, receiving of an SMS message, receiving of a WeChat message, receiving of a QQ message, or insufficient power. Alert tone control information corresponding to any two preset scenarios may be the same or different. The current scenario may be one of the preset scenarios. A process in which the processor 10 determines the current scenario, for example, the processor 10 determines that the terminal device has an incoming call or receives an SMS message, is described in detail in the prior art. Details are not described in this specification.

For example, the correspondence between a preset scenario and alert tone control information may be shown in Table 1.

TABLE 1

Alert tone control information used to control at least one of the following parameters of an alert tone

| Preset scenario | Frequency | Volume | Generation period | Single playback duration | Total quantity of playbacks |
|---|---|---|---|---|---|
| Scenario of an incoming call | B1 | C1 | D1 | E1 | F1 |
| Scenario of receiving an SMS message | B2 | C2 | D2 | E2 | F2 |
| Scenario of receiving a WeChat message | B3 | C3 | D3 | E3 | F3 |
| Scenario of receiving a QQ message | B4 | C4 | D4 | E4 | F4 |
| Scenario of insufficient power | B5 | C5 | D5 | E5 | F5 |

Referring to Table 1, an example in which the preset scenario is the scenario of an incoming call is used. Alert tone control information corresponding to the preset scenario may be at least one of B1, C1, D1, E1, and F1. Other examples are not enumerated one by one.

If in different scenarios in which there is the alert tone playback requirement, alert tone control information is the same, in another implementation, the alert tone control information may be prestored in the nonvolatile memory of the terminal device. When determining the current scenario, the processor 10 may send, to the DSD audio playback circuit 20, control information used to instruct to start to perform a procedure of generating the alert tone. Specific content of the control information is not limited in this embodiment of the present invention. After receiving the control information, the DSD audio playback circuit 20 may obtain the stored alert tone control information, and generate the alert tone based on the alert tone control information.

In some embodiments of this application, the DSD audio playback circuit 20 may superpose the alert tone and the processed DSD audio signal based on superposed signal control information corresponding to the current scenario. The superposed signal control information is information used to control a parameter of a superposed signal. The parameter of the superposed signal may include but is not limited to a volume of the superposed signal or the like. For an example of specific content of the superposed signal control information, refer to the following descriptions.

In the different scenarios in which there is the alert tone playback requirement, superposed signal control information may be the same or different. Based on this, in an implementation, a correspondence between a preset scenario and superposed signal control information may be prestored in the nonvolatile memory of the terminal device. In this case, when determining the current scenario, the processor 10 may determine, based on the correspondence between a preset scenario and superposed signal control information, the superposed signal control information corresponding to the current scenario, and input the superposed signal control information corresponding to the current scenario to the DSD audio playback circuit 20. The DSD audio playback circuit 20 may superpose the alert tone and the processed DSD audio signal after receiving the superposed signal control information corresponding to the current scenario.

Superposed signal control information corresponding to any two preset scenarios may be the same or different.

For example, the correspondence between a preset scenario and superposed signal control information may be shown in Table 2.

TABLE 2

| Preset scenario | Superposed signal control information used to control the following parameter of a superposed signal<br>Volume |
|---|---|
| Scenario of an incoming call | G1 |
| Scenario of receiving an SMS message | G2 |
| Scenario of receiving a WeChat message | G3 |
| Scenario of receiving a QQ message | G4 |
| Scenario of insufficient power | G5 |

Referring to Table 2, an example in which the preset scenario is the scenario of an incoming call is used. Superposed signal control information corresponding to the preset scenario may be G1. Other examples are not enumerated one by one.

If in the different scenarios in which there is the alert tone playback requirement, the superposed signal control information is the same, in another implementation, the superposed signal control information may be prestored in the nonvolatile memory of the terminal device. When determining the current scenario, the processor 10 may send, to the DSD audio playback circuit 20, the control information used to instruct to start to perform a procedure of generating the alert tone. After receiving the control information, the DSD audio playback circuit 20 may obtain the stored superposed signal control information, and superpose the alert tone and the processed DSD audio signal based on the superposed signal control information.

The following describes a specific implementation of the DSD audio playback circuit 20. Specifically, descriptions are provided by using an example in which the processor 10 inputs the alert tone control information to the DSD audio playback circuit 20, and optionally, the processor 10 further inputs the superposed signal control information to the DSD audio playback circuit 20.

Figure 4:
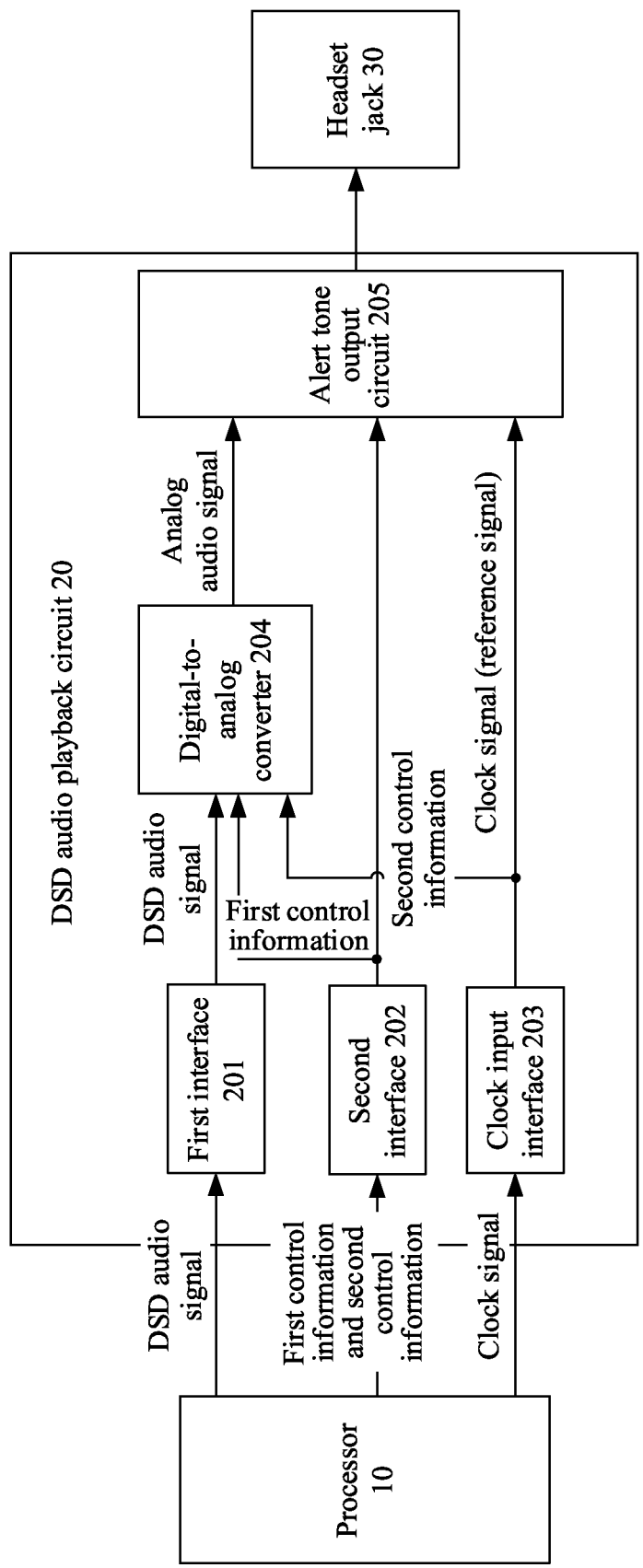
FIG. 4 is a schematic structural diagram 2 of a terminal device according to an embodiment of the present invention.

As shown in FIG. 4, the DSD audio playback circuit 20 may include a first interface 201, a second interface 202, a clock input interface 203, a digital-to-analog converter 204, an alert tone output circuit 205, and the like.

The processor 10 is connected to each of the first interface 201, the second interface 202, and the clock input interface 203. In an example, the DSD audio playback circuit 20 may be a DAC chip, the first interface 201 may be a DSD input interface, and the second interface 202 may be an I2C interface. In this case, that the processor 10 is connected to the first interface 201 may be specifically as follows: The processor 10 is connected to the DSD input interface by using an I2S, a dedicated DSD pin, or the like. That the processor 10 is connected to the second interface 202 may be specifically as follows: The processor 10 is connected to the I2C interface by using an I2C bus, or the like.

The digital-to-analog converter 204 may be connected to each of the first interface 201, the second interface 202, the clock input interface 203, and the alert tone output circuit 205. For a specific connection relationship, refer to FIG. 4.

The processor 10 may input a DSD audio signal to the digital-to-analog converter 204 through the first interface 201. For example, when determining that a user triggers playing of an audio file in a DSD format, the processor 10 inputs a to-be-played DSD audio signal to the digital-to-analog converter 204 through the first interface 201 in response to triggering performed by the user.

The processor 10 may input first control information to the digital-to-analog converter 204 through the second interface 202. The first control information is used to control the digital-to-analog converter 204. For example, the first control information is used to control a switch of the digital-to-analog converter 204, to control when the digital-to-analog converter 204 starts to work and when the digital-to-analog converter 204 stops working. For another example, the first control information may be used to control a digital-to-analog conversion rate, digital-to-analog conversion precision, and the like of the digital-to-analog converter 204.

The processor 10 may provide a clock signal for the DSD audio playback circuit 20 through the clock input interface 203. The clock signal is usually a periodic square wave signal, and is used to provide a clock for some or all digital circuit components (for example, a register) in the DSD audio playback circuit 20, to support the digital circuit components in working based on the clock signal. The clock signal may be used as a clock signal of a digital circuit component in the digital-to-analog converter 204. Certainly, the clock signal may alternatively be used as a clock signal of another module/unit/component (not shown in FIG. 4) in the DSD audio playback circuit 20.

The digital-to-analog converter 204 may be configured to perform, under control of the first control information that is input through the second interface 202, digital-to-analog conversion on the DSD audio signal that is input through the first interface 201, to obtain an analog audio signal, and output the analog audio signal to the alert tone output circuit 205.

The alert tone output circuit 205 may be connected to each of the second interface 202, the digital-to-analog converter 204, and the headset jack 30. For a specific connection relationship, refer to FIG. 4.

The processor 10 may input second control information to the alert tone output circuit 205 through the second interface 202. The second control information includes alert tone control information. Optionally, the second control information may further include superposed signal control information.

It may be understood that the alert tone output circuit 205 may alternatively be connected to the processor 10 through an interface (for example, an I2C interface) disposed in the DSD audio playback circuit 20 other than the second interface 202, so that the processor 10 inputs the second control information to the alert tone output circuit 205.

The alert tone output circuit 205 may generate an alert tone based on a reference signal and alert tone control information corresponding to a current scenario, and superpose the alert tone and the analog audio signal based on superposed signal control information corresponding to the current scenario. Ten, the alert tone output circuit 205 outputs a signal obtained after the superposition to the headset jack 30.

The reference signal may be a periodic signal, for example, a periodic square wave signal or a periodic sawtooth signal. Optionally, a value range of a frequency of the reference signal may be 20 Hz to 20,000 Hz. Optionally, the reference signal may be a clock signal of the DSD audio playback circuit 20. In this case, the alert tone output circuit 205 may be further connected to the clock input interface 203. In this way, the alert tone can be generated without providing a dedicated reference signal for the DSD audio playback circuit 20, so that implementation is simple. In addition, the reference signal may be a dedicated reference signal. Moreover, the reference signal may be a reference signal that is input by the processor 10 to the alert tone output circuit 205 through an interface disposed in the DSD audio playback circuit 20 other than the clock input interface 203, or may be a reference signal that is input by another processor 10 disposed in the terminal device to the alert tone output circuit 205. An example in which the reference signal is the clock signal of the DSD audio playback circuit 20 is used for description below.

The following describes a specific implementation of the alert tone output circuit 205.

Figure 5:
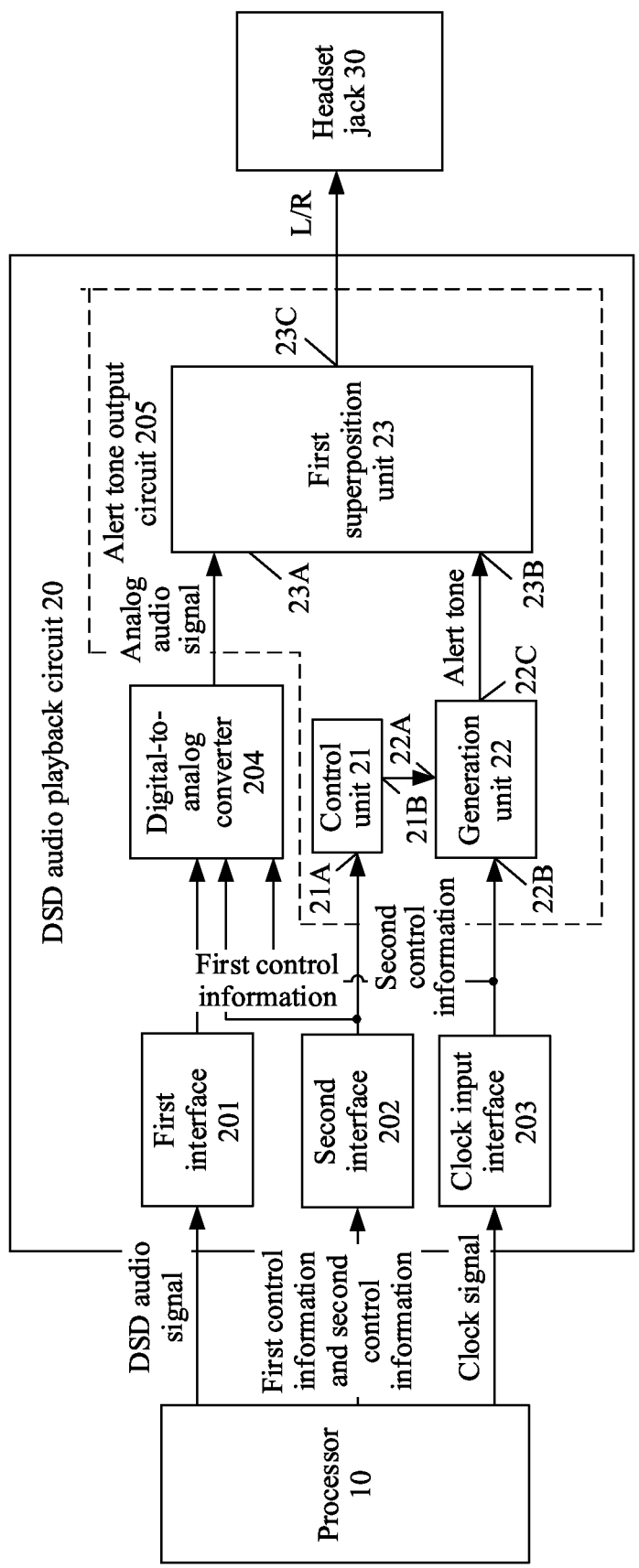
FIG. 5 is a schematic structural diagram 3 of a terminal device according to an embodiment of the present invention.

As shown in FIG. 5, the alert tone output circuit 205 may include a control unit 21, a generation unit 22, and a first superposition unit 23.

The control unit 21 may include an input end 21A and an output end 21B. The input end 21A of the control unit 21 is connected to the second interface 202, and is configured to receive second control information that is output by the processor 10. The second control information includes alert tone control information. The second control information may further include superposed signal control information.

The generation unit 22 includes a control end 22A, an input end 22B, and an output end 22C. The control end 22A of the generation unit 22 is connected to the output end 21B of the control unit 21, and may be configured to receive the second control information that is output by the control unit 21 by using the output end 21A. The input end 22B of the generation unit 22 is configured to receive a reference signal. For example, the input end 22B of the generation unit 22 may be connected to the clock input interface 203, and is configured to receive a clock signal that is output by the processor 10. The generation unit 22 is configured to generate an alert tone based on the reference signal under control of the alert tone control information.

The first superposition unit 23 includes a first input end 23A, a second input end 23B, and an output end 23C. The first input end 23A is connected to the digital-to-analog converter 204, and is configured to receive an analog audio signal that is output by the digital-to-analog converter 204. The second input end 23B is connected to the output end 22C of the generation unit 22, and is configured to receive the alert tone that is output by the generation unit 22 by using the output end 23. The first superposition unit 23 is configured to superpose the analog audio signal and the alert tone. The output end 13C of the first superposition unit 23 is connected to the headset jack 30, and is configured to output a signal obtained after the superposition to the headset jack 30. For ease of description, the signal obtained after the first superposition unit 23 performs the superposition is referred to as a superposed signal below.

Optionally, the first superposition unit 23 may further include a control end (not shown in FIG. 5). The control end is configured to receive superposed signal control information that is output by the control unit by using the output end 21B. In this case, the first superposition unit 23 may be specifically configured to superpose the analog audio signal and the alert tone based on the superposed signal control information.

It may be understood that the control unit 21 may output the alert tone control information to the generation unit 21 by using an output end 21B, and output the superposed signal control information to the first superposition unit 23 by using another output end 21B. Alternatively, the control unit 21 may output the alert tone control information to the generation unit 21, and output the superposed signal control information to the first superposition unit 23 by using a same output end 21B. This is not limited in this application.

It should be noted that the audio signal that is output by the terminal device to the headset includes a left-channel audio signal and a right-channel audio signal. The superposed signal generated by the first superposition unit 23 may be one of the left-channel audio signal and the right-channel audio signal, and is marked as L/R in FIG. 5.

Figure 6:
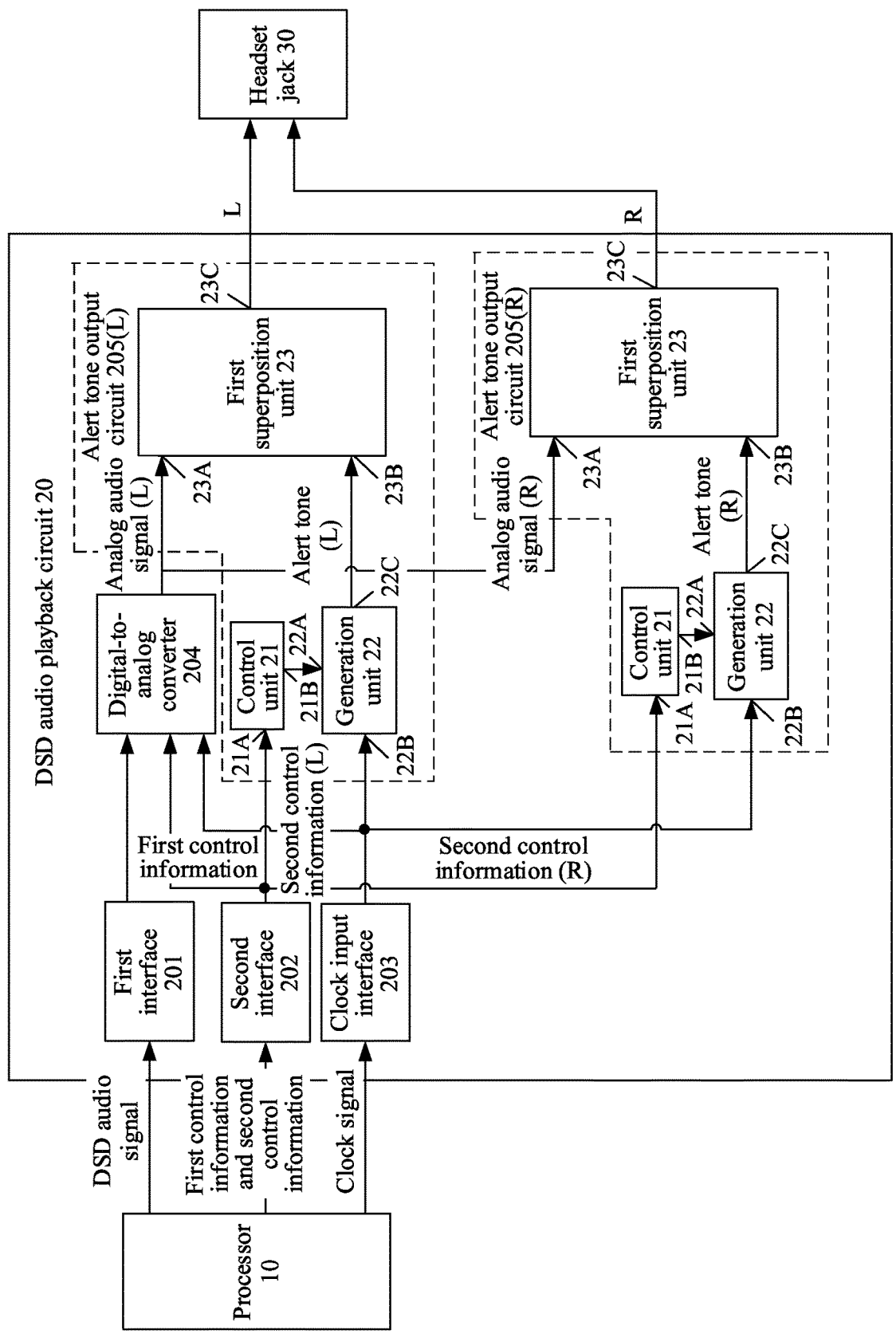
FIG. 6 is a schematic structural diagram 4 of a terminal device according to an embodiment of the present invention.

If the terminal device outputs both the left-channel audio signal and the right-channel audio signal to the headset, the DSD audio playback circuit 20 may include two alert tone output circuits 205. In addition, a separate control unit 21 may be disposed in each of the two alert tone output circuits 205, or the two alert tone output circuits 205 may share a same control unit 21; and a generation unit 22 and a first superposition unit 23 may be disposed in each of the two alert tone output circuits 205. FIG. 6 is a schematic structural diagram of a terminal device according to an embodiment of the present invention. In FIG. 6, a DSD audio playback circuit 20 includes two alert tone output circuits 205, and a control unit 21, a generation unit 22, and a first superposition unit 23 are disposed in each of the two alert tone output circuits 205. In FIG. 6, the two alert tone output circuits 205 are respectively marked as an alert tone output circuit 205(L) and an alert tone output circuit 205(R). Correspondingly, a mark (L) or (R) is also added to analog audio signals, alert tones, second control information, and the like that are related to the two alert tone output circuits 205. For details, refer to FIG. 6. The alert tone output circuit 205(L) outputs a left-channel audio signal to a headset, and the alert tone output circuit 205(R) outputs a right-channel audio signal to the headset. Second control information (L) and second control information (R) may be the same or different. Correspondingly, an alert tone (L) and an alert tone (R) may be the same or different.

For ease of description, an example in which the terminal device outputs one of the left-channel audio signal and the right-channel audio signal to the headset is used for description below. That is, the DSD audio playback circuit 20 shown in FIG. 5 is used as an example for description.

The following describes specific implementations of the control unit 21, the generation unit 22, and the first superposition unit 23.

One or more registers may be disposed in the control unit 21. Each register may store one or more types of alert tone control information and/or one or more types of superposed signal control information. Each type of alert tone control information is used to control one parameter of an alert tone, and the parameter may be any parameter shown in Table 1. Each type of superposed signal alert tone is used to control one parameter of a superposed signal, and the parameter may be any parameter shown in Table 2. After determining alert tone control information corresponding to a current scenario, the processor 10 may write the corresponding alert tone control information into a corresponding register. The control unit 21 may read the alert tone control information stored in the corresponding register, to control a corresponding parameter of the alert tone. The corresponding parameter may be a parameter of the alert tone shown in Table 1. For example, it is assumed that a plurality of registers include a first register and a second register, the first register is configured to store alert tone control information used to control a frequency of the alert tone, and the second register is configured to store alert tone control information used to control a volume of the alert tone. With reference to Table 1, when the processor 10 determines that a preset scenario is the scenario of an incoming call, the processor 10 may write B1 into the first register, and write C1 into the second register. The control unit 21 may read B1 stored in the first register, to control the frequency of the alert tone, and read C1 stored in the second register, to control the volume of the alert tone. In addition, after determining superposed signal control information corresponding to the current scenario, the processor 10 may write the corresponding superposed signal control information into the corresponding register. The control unit 21 may read the superposed signal control information stored in the register, to control a corresponding parameter of the superposed signal, so as to control the first superposition unit 23 to superpose the alert tone and an analog audio signal. The corresponding parameter may be a parameter of the superposed signal shown in Table 2.

The following describes a specific implementation of the generation unit 22, and describes, in this process, a specific implementation of alert tone control information used to control a frequency and a volume that are of an alert tone.

Figure 7:
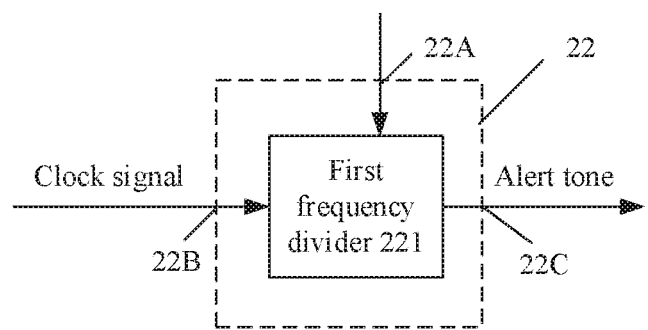
FIG. 7 is a schematic structural diagram 1 of a generation unit according to an embodiment of the present invention.

In some embodiments, as shown in FIG. 7, the generation unit 22 may include a first frequency divider 221. The first frequency divider 221 may include a control end, an input end, and an output end. The control end of the first frequency divider 221 is the control end 22A of the generation unit 22, the input end of the first frequency divider 221 is the input end 22B of the generation unit 22, and the output end of the first frequency divider 221 is the output end 22C of the generation unit 22. The first frequency divider 221 is configured to perform frequency division processing on an analog audio signal, to generate an alert tone with a frequency. The frequency herein may be any frequency in a range of 20 Hz to 20,000 Hz.

In this embodiment, the alert tone may be a single-frequency alert tone, and an implementation of the alert tone output circuit 205 may be simplified by using the single-frequency alert tone. Assuming that the frequency of the alert tone is f1, in this embodiment, alert tone control information that is output by the control unit 21 to the control end of the first frequency divider 221 may be specifically information used to control the first frequency divider 221 to generate a signal with the frequency f1. For example, the information may be a frequency division factor used when the first frequency divider 221 generates the signal with the frequency f1. If a frequency of an input signal of the first frequency divider 221 is f, the frequency division factor may be f1/f.

In an implementation, the frequency f of the input signal of the first frequency divider 221 may be a frequency of a reference signal. In this case, if the reference signal is a clock signal of the DSD audio playback circuit 20, when the solutions are applied to the terminal device shown in FIG. 4, the input end of the first frequency divider 221 may be connected to the clock input interface 203.

Figure 8:
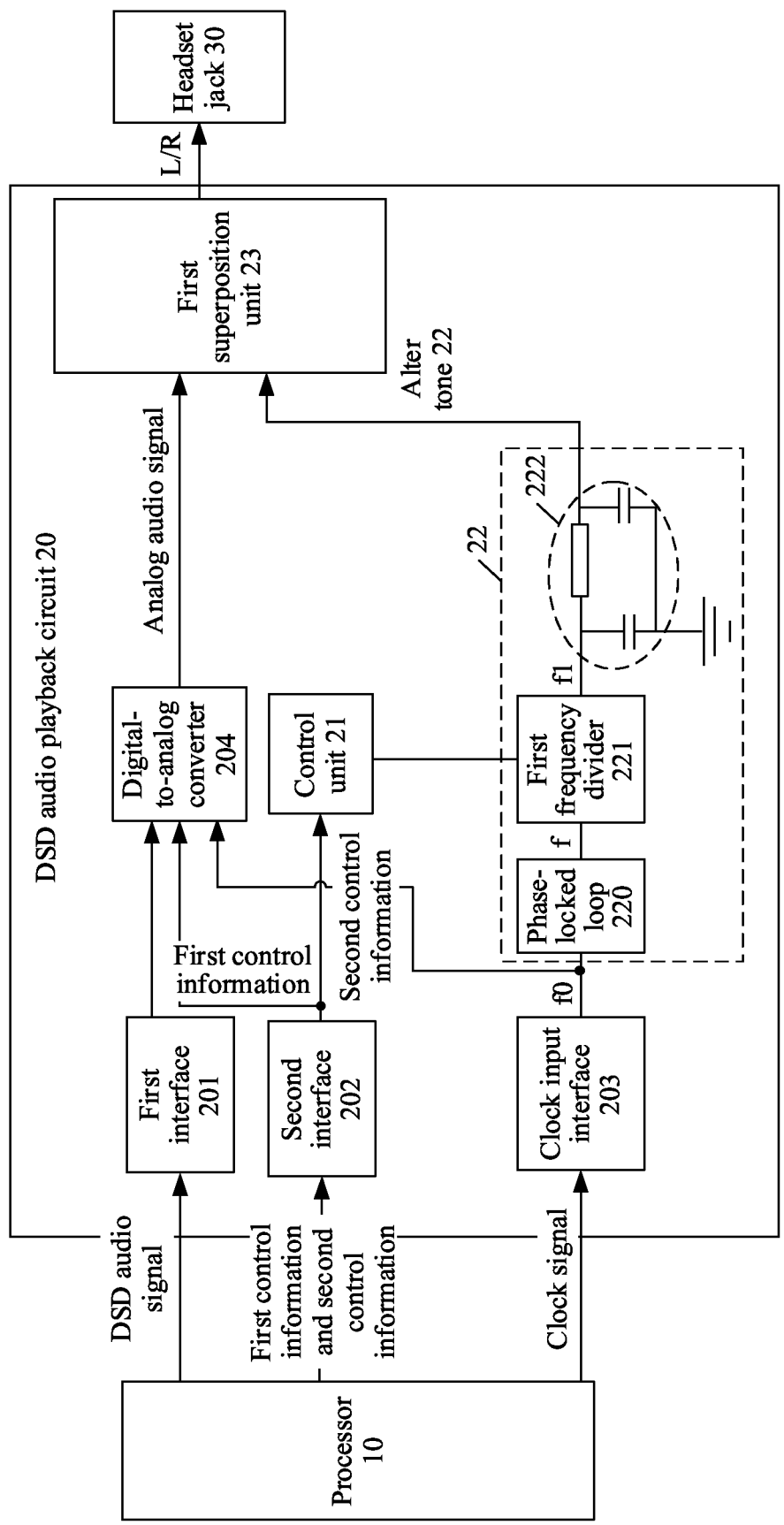
FIG. 8 is a schematic structural diagram 5 of a terminal device according to an embodiment of the present invention.

In another implementation, the frequency of the input signal of the first frequency divider 221 may be a signal obtained after a frequency of a reference signal is processed. As shown in FIG. 8, the generation unit 22 may further include a phase-locked loop (phase locked loop) 220. The reference signal is input to the first frequency divider 221 after passing through the phase-locked loop 220. In this case, an input end of the phase-locked loop 220 is the input end 22B of the generation unit 22. For example, if the reference signal is a clock signal of the DSD audio playback circuit 20, when the solutions are applied to the terminal device shown in FIG. 4, the phase-locked loop 220 may be located between the clock input interface 203 and the first frequency divider 221, the clock input interface 203 is connected to the input end of the phase-locked loop 220, and an output end of the phase-locked loop 220 is connected to the input end of the first frequency divider 221. The phase-locked loop 220 is configured to: lock a phase of the clock signal, and make a frequency of an output signal greater than, equal to, or less than a frequency of the clock signal, so that a frequency of an alert tone obtained after the first frequency divider 221 performs frequency division may be greater than, equal to, or less than the frequency of the clock signal. In FIG. 8, descriptions are provided by using an example in which the frequency of the clock signal of the DSD audio playback circuit 20 is f1, the frequency of the signal obtained after passing through the phase-locked loop 220 is f, and the frequency of the signal obtained after passing through the first frequency divider 221 is f. Herein, f0 may be greater than, equal to, or less than f, and f1 is usually less than f.

As shown in FIG. 8, the generation unit 22 may further include a first low-pass filter 222. The first low-pass filter 222 may be disposed between the first frequency divider 221 and the first superposition unit 23, to attenuate a high-order harmonic wave in the alert tone. In this way, a sharp and harsh alert tone can be avoided as much as possible. The first low-pass filter 222 may include a resistor and a capacitor. A cut-off frequency of low-pass filtering may be changed by adjusting a capacitance value of the capacitor, to attenuate the high-order harmonic wave in the alert tone to different degrees.

Figure 9:
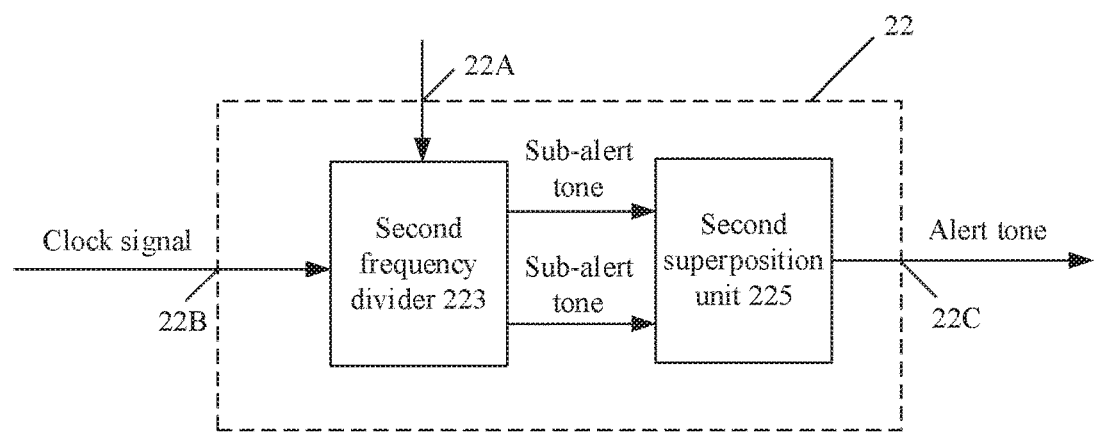
FIG. 9 is a schematic structural diagram 2 of a generation unit according to an embodiment of the present invention.

In some other embodiments, as shown in FIG. 9, the generation unit 22 may include a second frequency divider 223 and a second superposition unit 225.

The second frequency divider 223 may include a control end, an input end, and m output ends, where m is an integer greater than or equal to 2. The control end of the second frequency divider 223 is the control end 22A of the generation unit 22, and the input end of the second frequency divider 223 is the input end 22B of the generation unit 22. The second frequency divider 223 is configured to generate m sub-alert tones under control of alert tone control information, where different sub-alert tones have different frequencies. Each output end of the second frequency divider 223 is configured to output one sub-alert tone. In FIG. 9, that m=2 is used as an example for description.

The second superposition unit 225 includes an output end and m input ends, the output end of the second superposition unit 225 is the output end 22C of the generation unit 22, and each input end of the second superposition unit 225 is connected to one output end of the second frequency divider 223. The second superposition unit 225 is configured to superpose the m sub-alert tones that are output by the second frequency divider 223, to generate an alert tone.

In this embodiment, the alert tone may be a multi-frequency alert tone. In this embodiment, the alert tone is obtained by superposing a plurality of sub-alert tones with different frequencies. In this way, because each sub-alert tone can be directly generated by the second frequency divider 223, the circuit is not too complex. In addition, a frequency of the sub-alert tone may be set, so that a difference between frequencies of different sub-alert tones is relatively large. For example, when m=2, a frequency of one sub-alert tone may be set to f2, and a frequency of the other sub-alert tone may be set to f3, where a frequency difference between f2 and 3 is relatively large. This helps reduce a possibility that the alert tone is masked by an analog audio signal converted from a DSD audio signal, so that a probability that a user can hear the alert tone when listening to, by using the headset, an audio signal that is based on the DSD audio signal is relatively high.

Assuming that the alert tone is a dual-frequency alert tone, in other words, m=2, a frequency of one sub-alert tone is f1, and a frequency of the other sub-alert tone is f3, in this embodiment, alert tone control information that is input by the control unit 21 to the control end of the second frequency divider 223 may be specifically information used to control the second frequency divider 223 to generate a signal with the frequency f2 and a signal with the frequency f3. For example, the alert tone control information may be frequency division factors used when the second frequency divider 223 generates a sub-alert tone with the frequency f2 and a sub-alert tone with the frequency f3. For example, assuming a frequency of an input signal of the second frequency divider 223 is f, a frequency division factor used when the sub-alert tone with the frequency f1 is generated is f2/f, and a frequency division factor used when the sub-alert tone with the frequency 3 is generated is f3/f.

Assuming that the alert tone is a dual-frequency alert tone, in other words, m=2, a frequency of one sub-alert tone is f2, and a frequency of the other sub-alert tone is f3, a correspondence that is between f2 and f3 and that corresponds to different preset scenarios may be shown in Table 3.

TABLE 3

| Preset scenario | Frequency f2 (unit: Hz) | Frequency f3 (unit: Hz) |
| --- | --- | --- |
| Scenario of an incoming call | 1000 | 3000 |
| Scenario of receiving an SMS message | 800 | 3500 |
| Scenario of receiving a WeChat message | 600 | 3800 |
| Scenario of receiving a QQ message | 500 | 4000 |
| Scenario of insufficient power | 400 | 4200 |

Based on Table 3, if the frequency of the input signal of the second frequency divider 223 is f, a value of the frequency division factor f2/f used when the second frequency divider 223 generates the sub-alert tone with the frequency 12 in each preset scenario in Table 3 may be obtained, and a value of the frequency division factor f3/f used when the second frequency divider 223 generates the sub-alert tone with the frequency f3 in each preset scenario in Table 3 may be obtained. With reference to Table 1, B1, B2, B3, B4, and B5 in Table 1 may be obtained. For example, B1 in the scenario of an incoming call may be specifically 1000/f and 3000/f. For another example, B2 in the scenario of receiving an SMS message may be specifically 800/f and 3500/f.

Figure 10:
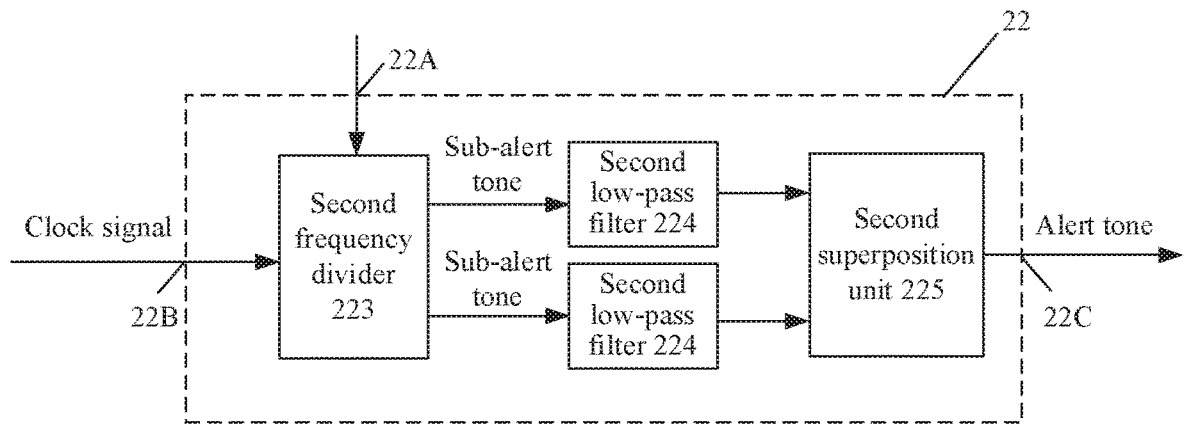
FIG. 10 is a schematic structural diagram 3 of a generation unit according to an embodiment of the present invention.

Optionally, a second low-pass filter 224 is disposed between the second frequency divider 223 and the second superposition unit 225, to attenuate high harmonic waves in the m sub-alert tones. In this way, a sharp and harsh alert tone can be avoided as much as possible. The second low-pass filter 224 may include a resistor and a capacitor. A cut-off frequency of low-pass filtering may be changed by adjusting a capacitance value of the capacitor, to attenuate the high-order harmonic wave in the sub-alert tone to different degrees. Further, optionally, as shown in FIG. 10, one second low-pass filter 224 is disposed for each sub-alert tone, to attenuate a high-order harmonic wave in the sub-alert tone.

Figure 11:
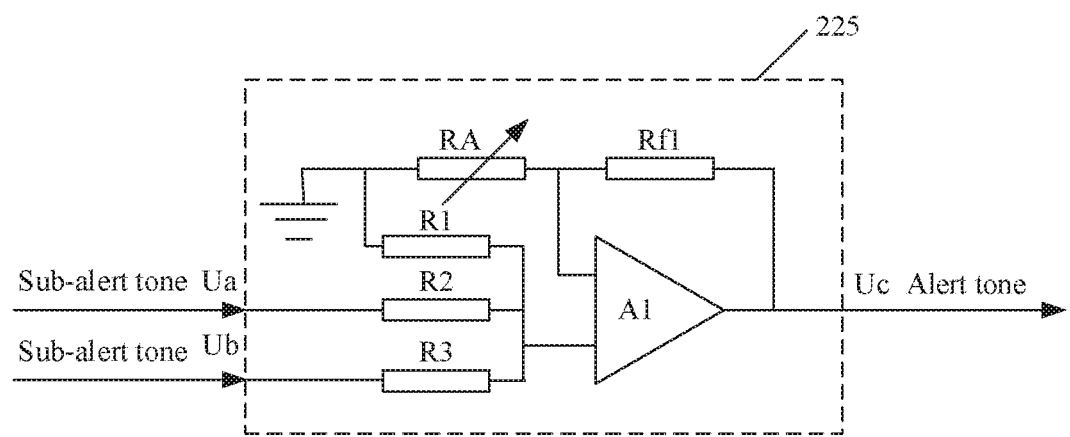
FIG. 11 is a schematic structural diagram of a first superposition unit according to an embodiment of the present invention.

As shown in FIG. 11, the second superposition unit 225 may include a second amplifier A1. The second amplifier A1 includes a non-inverting end, an inverting end, and an output end. The non-inverting end of the second amplifier A1 receives the m sub-alert tones. The inverting end of the second amplifier A1 is grounded by using a second grounding resistor RA. The output end of the second amplifier A1 is the output end of the second superposition unit 225.

It may be understood that the second amplifier A1 may amplify, based on the superposition of the m sub-alert tones, an alert tone obtained through the superposition. To implement a superposition and amplification function of the second amplifier A1, the second superposition unit 225 may further include resistors R1, R2, R3, and Rf1. For a connection relationship between each resistor and the second amplifier A1, refer to FIG. 11. In FIG. 11, input voltages of two input ends of the second superposition unit 225 are respectively marked as Ua and Ub, and an output voltage of the output end of the second superposition unit 225 is marked as Uc.

Usually, Rf1 is an adjustable resistor. The RA may be a non-adjustable resistor, or may be an adjustable resistor. In FIG. 11, an example in which the RA is the adjustable resistor is used for description. If the RA is the adjustable resistor, a gain of the second amplifier A1 may be controlled by adjusting resistance values of the RA and the Rf1, to control a volume of the alert tone. For example, referring to FIG. 11, a relationship between the output voltage Uc and the input voltages Ua and Ub of the second superposition unit 225 may be represented by using the following formula:

$$Uc = \left(1 + \frac{Rf1}{RA}\right)\left(Ua\frac{R1 // R3}{R1 // R3 + R2} + Ub\frac{R // R2}{R1 // R2 + R3}\right).$$

Because resistance values of the R1, the R2, and the R3 are usually fixed, the output voltage Uc of the second amplifier A1 may be controlled by adjusting the resistance values of the RA and the Rf1. A larger value of Uc indicates a higher volume of the alert tone.

Figure 12:
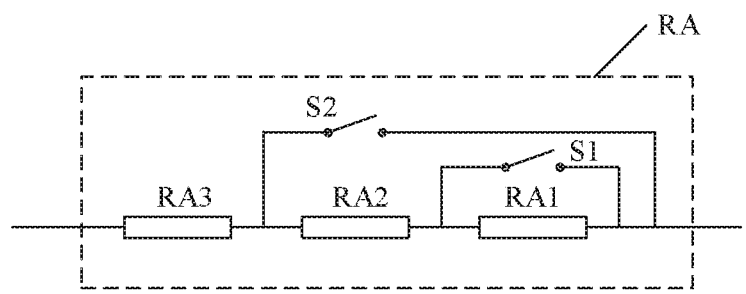
FIG. 12 is a schematic structural diagram of an adjustable resistor RA according to an embodiment of the present invention.

If the RA is an adjustable resistor, an implementation solution for implementing an adjustable resistance value of the RA is shown in FIG. 12. In FIG. 12, the resistance value of the RA may be controlled by controlling off states of switches S1 and S2. For example, when both the switches S1 and S2 are turned on, the resistance value of the RA is a sum of resistance values of resistors RA 1, RA 2, and RA 3. For another example, when the switch S1 is turned off and the switch S2 is turned on, the resistance value of the RA is a sum of resistance values of resistors RA 2 and RA 3. Optionally, the resistance value of the RA may be controlled by the control unit 21. For example, a second register may be disposed in the control unit 21. With reference to FIG. 12, alert tone control information stored in the second register may be specifically the off states of the switches S1 and S2. The control unit 21 may read the alert tone control information stored in the second register, to control the off states of the switches S1 and S2, so as to adjust the resistance value of the RA, thereby controlling the volume of the alert tone. With reference to FIG. 12 and Table 1, assuming that the preset scenario is the scenario of an incoming call, C1 in Table 1 may be that both the switches S1 and S2 are in an on state; and assuming that the preset scenario is the scenario of receiving an SMS message, C2 in Table 1 may be that the switch S1 is in an on state, and the switch S2 is in an off state. Other examples are not enumerated one by one.

It should be noted that FIG. 12 is an implementation for implementing the adjustable resistor RA. A quantity of resistors (for example, the RA 1, the RA 2, and the RA 3), a resistance value of each resistor, a connection relationship between the resistors, a quantity of switches, a connection relationship between a switch and a resistor, and the like that are set in the implementation for implementing the adjustable resistor RA are not limited in this application.

Figure 13:
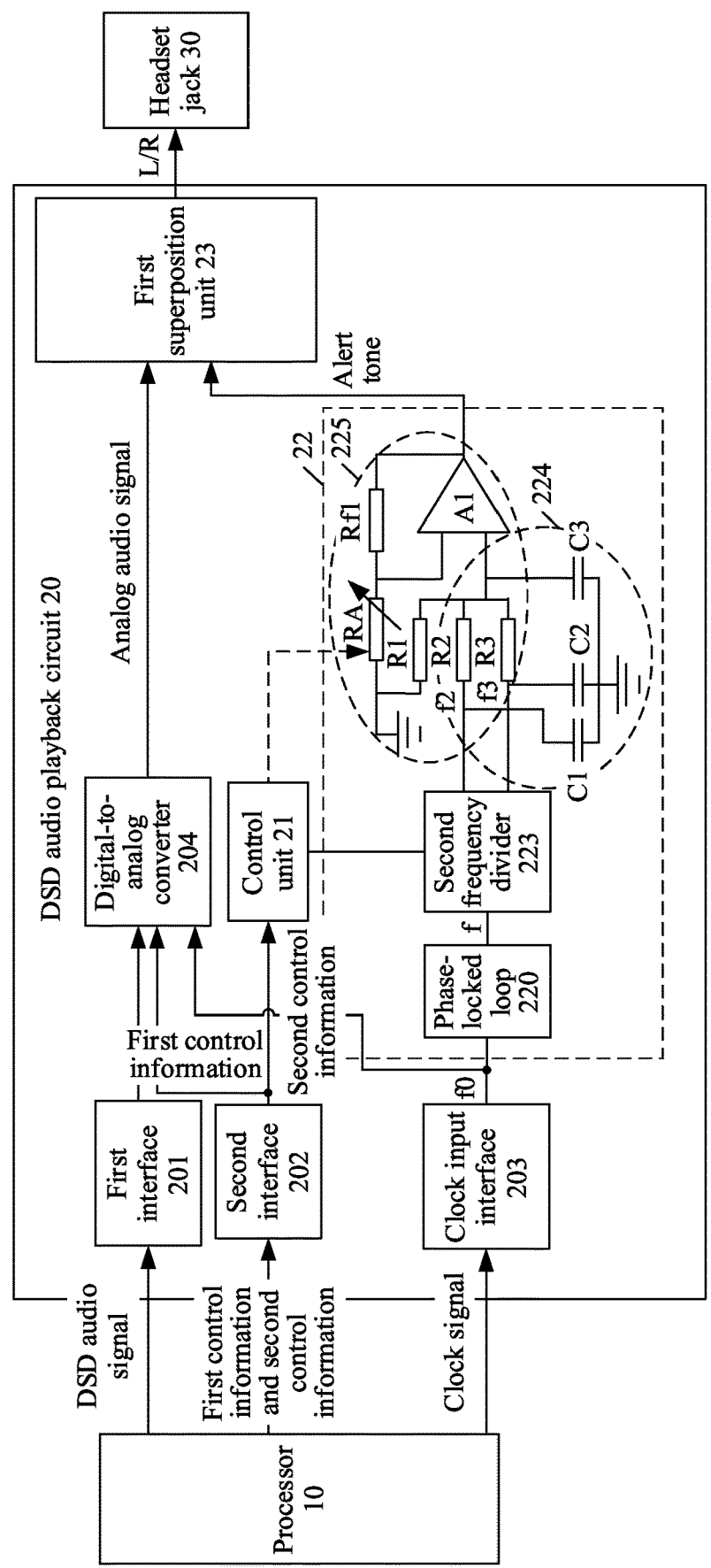
FIG. 13 is a schematic structural diagram 6 of a terminal device according to an embodiment of the present invention.

It can be understood that the generation unit 22 may further include a phase-locked loop 220. For related descriptions of the phase-locked loop 220, refer to the foregoing descriptions. In this case, as shown in FIG. 13, an input end of the phase-locked loop 220 is the input end 22B of the generation unit 22. In FIG. 13, descriptions are provided by using an example in which a frequency of a clock signal of the DSD audio playback circuit 20 is f0, a frequency of a signal obtained after passing through the phase-locked loop 220 is f, and frequencies of signals obtained after passing through the second frequency divider 223 are f2 and f3, where f0 may be greater than, equal to, or less than f. Usually, f2 is less than f, and f3 is less than f.

Further, optionally, a plurality of second low-pass filters 224 may share a component. For example, as shown in FIG. 13, a capacitor C1, a resistor R2, and a capacitor C3 form a second low-pass filter 224, to perform low-pass filtering on a sub-alert tone with the frequency f2. A capacitor C2, a resistor R3, and the capacitor C3 form a second low-pass filter 224, to perform low-pass filtering on a sub-alert tone with the frequency f. The two second low-pass filters 224 share the capacitor C3.

Further, optionally, the second superposition unit 225 and the second low-pass filter 224 may share a component. For example, as shown in FIG. 13, the second superposition unit 225 and the two second low-pass filters 224 share the resistors R2 and R3.

The following describes a specific implementation of the first superposition unit 23, and describes, in this process, a specific implementation of superposed signal control information.

Figure 14:
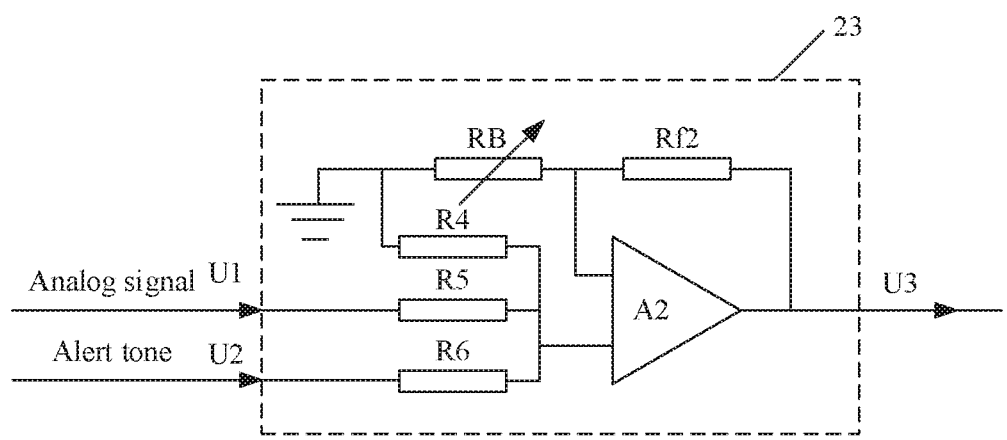
FIG. 14 is a schematic structural diagram of a second superposition unit according to an embodiment of the present invention.

As shown in FIG. 14, the first superposition unit 23 may include a first amplifier A2. The first amplifier A2 includes a non-inverting end, an inverting end, and an output end. The non-inverting end of the first amplifier A2 is configured to receive the foregoing analog audio signal and alert tone. The inverting end of the first amplifier A2 is grounded by using a first grounding resistor RB. The output end of the first amplifier A2 is the output end of the first superposition unit 23.

The first amplifier A2 may amplify a superposed signal based on superposition of the foregoing analog audio signal and alert tone. To implement a superposition and amplification function of the first amplifier A2, the first superposition unit 23 may further include resistors R4, R5, R6, and Rf2. For a connection relationship between each resistor and the first amplifier A2, refer to FIG. 14. In FIG. 14, input voltages of two input ends of the first superposition unit 23 are respectively marked as U1 and U2, and an output voltage is marked as U3.

Usually, Rf2 is an adjustable resistor. The RB may be an adjustable resistor, or may be a non-adjustable resistor. In FIG. 14, an example in which the RB is the adjustable resistor is used for description. If the RB is the adjustable resistor, the voltage U3 of the first amplifier A2 may be controlled by adjusting resistance values of the RB and the Rf2, to control a volume of the superposed signal, where a higher voltage U3 indicates a larger volume of the superposed signal. For example, referring to FIG. 14, a relationship between the output voltage U3 and the input voltages U1 and U2 of the first superposition unit 23 may be represented by using the following formula:

$$U3 = \left(1 + \frac{Rf2}{RB}\right)\left(U1\frac{R4 // R6}{R4 // R6 + R5} + U2\frac{R4 // R5}{R4 // R5 + R6}\right).$$

Because resistance values of the R4, the R5, and the R6 are usually fixed, the output voltage U3 of the first amplifier A2 may be controlled by adjusting the resistance values of the RB and the Rf2.

If the RB is an adjustable resistor, for an implementation solution for implementing an adjustable resistance value of the RB, reference may be made to the implementation solution for implementing an adjustable resistance value of the RA shown in FIG. 12. Details are not described herein again. Optionally, the resistance value of the RB may be controlled by the control unit 21. For example, a third register may be disposed in the control unit 21. Superposed signal control information stored in the third register may be specifically an off state of each switch in the implementation solution for implementing an adjustable resistance value of the RB. The control unit 21 may read the superposed signal control information stored in the third register, to control the off state of each switch, so as to adjust the resistance value of the RB, thereby adjusting and controlling the volume of the superposed signal.

Figure 15:
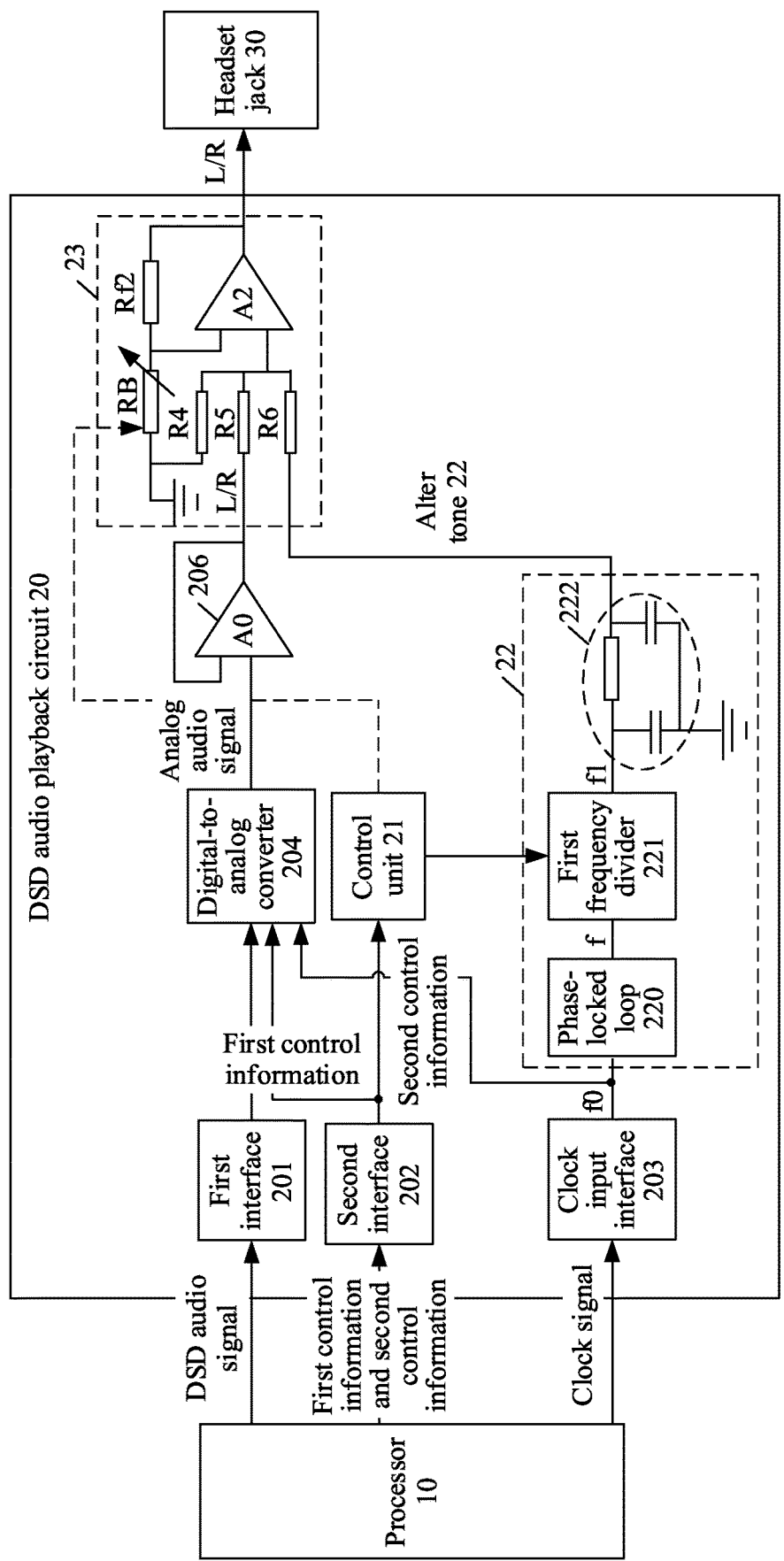
FIG. 15 is a schematic structural diagram 7 of a terminal device according to an embodiment of the present invention.
Figure 16:
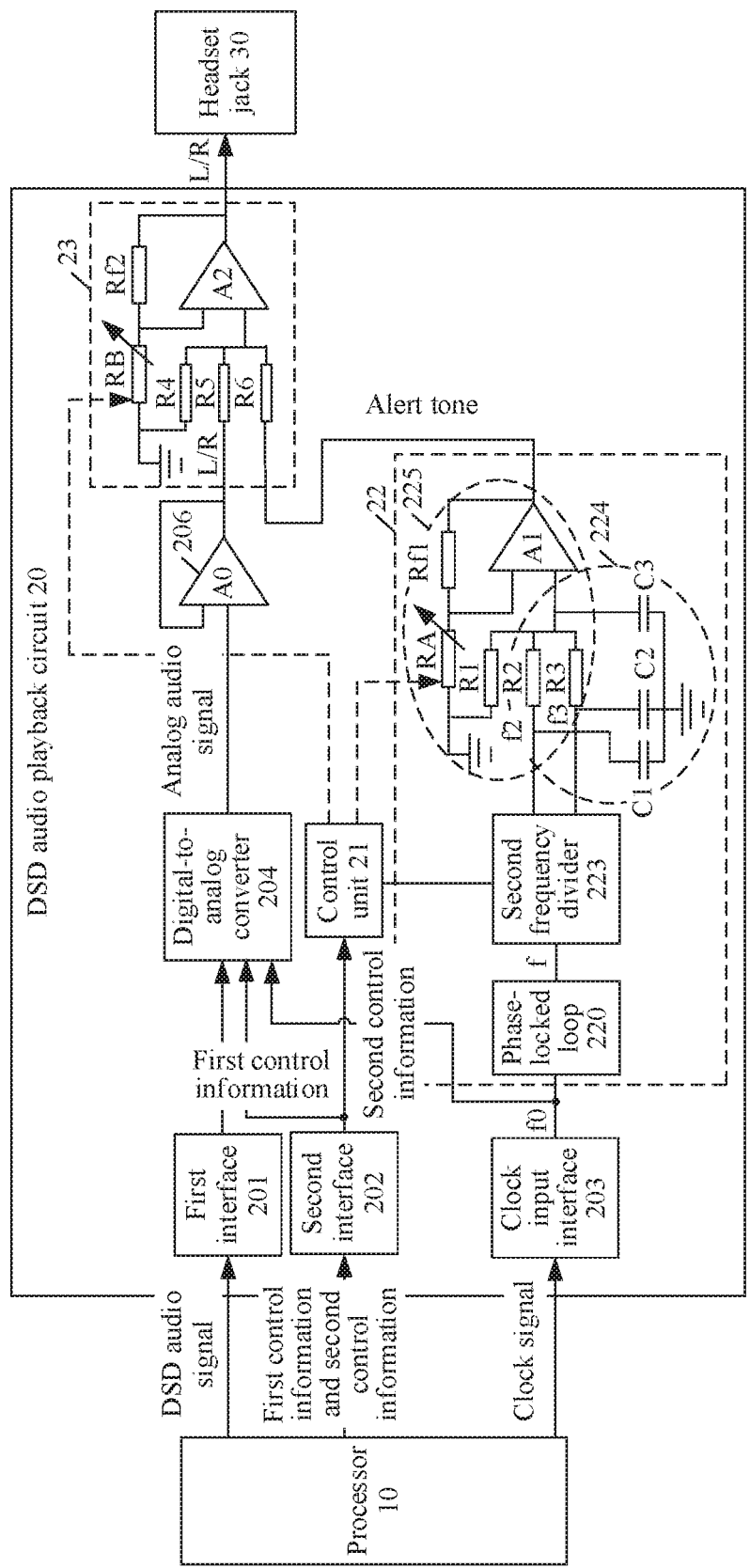
FIG. 16 is a schematic structural diagram 8 of a terminal device according to an embodiment of the present invention.

Optionally, based on any one of the foregoing embodiments, a voltage follower 206 may be disposed between the digital-to-analog converter 204 and the first superposition unit 23. As shown in FIG. 15 or FIG. 16, the voltage follower 206 may be implemented by using an amplifier A0. FIG. 15 is drawn based on FIG. 8 and FIG. 14. FIG. 16 is drawn based on FIG. 13 and FIG. 14. The voltage follower is a type of electronic element that enables an output voltage to follow a variation of an input voltage. That is, a voltage amplification factor of the voltage follower is always less than and close to 1. The voltage follower may perform functions such as buffering, isolation, and loading capability improvement.

In addition, the control unit 21 may be further provided with the following registers: a fourth register, a fifth register, and a sixth register.

The fourth register is configured to store alert tone control information used to control a generation period of the alert tone. The fourth register may be understood as a counter/timer/timer, or the like. The alert tone control information used to control the generation period of the alert tone may be specifically an initial value of the counter/timer/timer. For example, the fourth register is a timer 1, and the processor 10 writes an initial value of one timing time into the timer 1 at an interval of first timing duration. The timer 1 starts timing when the initial value is saved, and when the timing time reaches a first preset value, the control unit 21 controls the generation unit 22 to start to generate one alert tone. In this way, the generation unit 22 can periodically generate the alert tone. The first timing duration (that is, a time used when the timing time of the timer 1 reaches the first preset value from the initial value) is the generation period of the alert tone. In each generation period, when to stop the alert tone may be determined by using information stored in the fifth register.

The fifth register is configured to store alert tone control information used to control single playback duration of the alert tone. The fifth register may be a counter/timer/timer, or the like. The alert tone control information used to control the generation period of the alert tone may be specifically an initial value of the counter/timer/timer. For example, the fifth register is a timer 2, and the processor 10 writes an initial value of one timing time into the timer 2 when the timing time of the timer 1 reaches the first preset value (at this moment, the alert tone starts to be generated, that is, the alert tone starts to be played). The timer 2 starts timing when the initial value is saved, and when the timing time reaches a second preset value, the control unit 21 controls the generation unit 22 to stop generating the alert tone, that is, stop playing the alert tone. Second timing duration (that is, a time used when the timing time of the timer 2 reaches the second preset value from the initial value) is the single playback duration of the alert tone. The second timing duration is less than the first timing duration.

The sixth register is configured to store alert tone control information used to control a total quantity of playbacks of the alert tone. The sixth register may be a counter/timer/timer, or the like. The alert tone control information used to control the generation period of the alert tone may be specifically an initial value of the counter/timer/timer. For example, the sixth register is a counter. The counter starts counting when the initial value is saved. Each time the generation unit 22 generates one alert tone, a count value of the counter increases by a preset step. When the count value of the counter reaches a third preset value, the control unit 21 controls the generation unit 22 to stop generating the alert tone. The preset step may be greater than 0. A quantity of counting times of the counter is the quantity of playbacks of the alert tone, that is, a quantity of times that the count value of the counter increases in a process of reaching the third preset value from the initial value.

The following describes an operating principle of the alert tone output circuit 205 based on FIG. 5 and FIG. 16.

(1) When determining that there is an alert tone playback requirement, that is, determining a current scenario, the processor 10 first determines, through looking up a table, for example, looking up Table 1 and Table 2 (certainly, or looking up Table 1), second control information corresponding to the current scenario, and then writes the corresponding second control information into a corresponding register of the control unit 21 of the DSD audio playback circuit through the second interface 202. In this case, each register, the second frequency divider 223, and other components in the alert tone output circuit 205 enter a working state. The fourth register may be the foregoing timer 1, the fifth register may be the foregoing timer 2, and the sixth register may be a counter.

For example, when determining that there is an incoming call, in other words, the current scenario is the scenario of an incoming call, the processor 10 determines, through looking up Table 1, that alert tone control information corresponding to the current scenario is alert tone control information B1, C1, D1, E1, and F1, determines, through looking up Table 2, that superposed signal control information corresponding to the current scenario is superposed signal control information G1, then writes the alert tone control information B1 into the first register, writes the alert tone control information C1 into the second register, writes the alert tone control information D1 into the fourth register, writes the alert tone control information E1 into the fifth register, writes the alert tone control information F1 into the sixth register, and writes the superposed signal control information G1 into the third register.

With reference to FIG. 16, it can be learned from the foregoing descriptions that the alert tone control information B1 may be the frequency factors f2/f and f3/f. The alert tone control information C1 may be the off states of the switches S1 and S2 in FIG. 11. The alert tone control information D1 may be the initial value of the timing time of the timer 1 used as the fourth register. The alert tone control information E1 may be the initial value of the timing time of the timer 2 used as the fifth register. The alert tone control information F1 may be the initial value of the count value of the timer used as the sixth register. The superposed signal control information G1 may be the off state of each switch configured to adjust the resistance value of the RB.

(2) The processor 10 writes the initial value of the timing time of the timer 1 into the timer 1 at an interval of the first timing duration, and each time the timing time of the timer 1 used as the fourth register reaches the first preset value from the initial value, the control unit 21 outputs a signal to the control end of the second frequency divider 223, to enable a state of an enable EN signal of the second frequency divider 223 to jump once, so that the second frequency divider 223 can periodically generate the alert tone.

Each time the second frequency divider 223 is enabled, a count value stored in the sixth register is decreased by 1. When the count value stored in the sixth register is decreased to the third preset value, the control unit 21 no longer controls the state of the enable EN signal of the second frequency divider 223 to jump. That is, the control unit 21 controls the second frequency divider 223 to stop generating the alert tone. In this case, the control unit 21, the second frequency divider 223, and other components in the alert tone output circuit 205 enter a sleep state.

Each time the timing time of the timer 1 used as the fourth register reaches the first preset value, the processor 10 writes the initial value of the timing time of the timer 2 into the fifth register, so that each time the second frequency divider 223 is enabled, when the initial value of the timing time of the timer 2 used as the fifth register is set, the alert tone starts to be played, and each time the timing time of the timer 2 reaches the second preset value, the alert tone stops to be played.

The following describes a DSD audio playback method according to an embodiment of the present invention.

Figure 17:
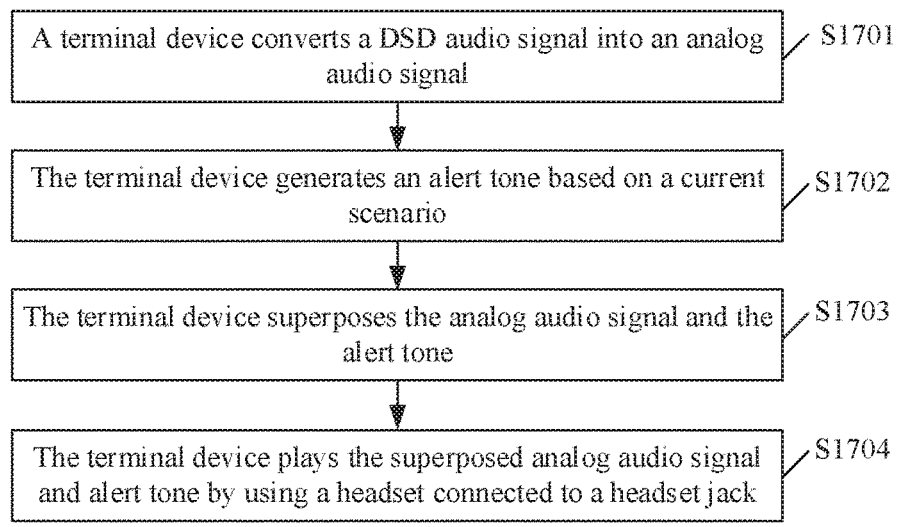
FIG. 17 is a schematic flowchart of a DSD audio playback method according to an embodiment of the present invention.

FIG. 17 is a schematic flowchart of a DSD audio playback method according to an embodiment of the present invention. The method may be applied to any terminal device provided above. The method may include the following steps.

S1701. The terminal device converts a DSD audio signal into an analog audio signal. Specifically, when being triggered by a user, the terminal device may convert a to-be-played DSD audio signal into an analog audio signal, and play the analog audio signal.

It may be understood that if an alert tone does not need to be played at a current moment, that is, a scenario in which the terminal device is located at the current moment does not belong to any preset scenario in which there is an alert tone playback requirement, after converting the DSD audio signal into the analog audio signal, the terminal device may play the analog audio signal by using a headset connected to the terminal device. Usually, the terminal device may play the analog audio signal for a period of time. For example, when the terminal device needs to play music under triggering of the user, the music may be played for a period of time. Specifically, in a process in which the terminal device plays the analog audio signal, if determining that the current scenario is a scenario in which there is the alert tone playback requirement, the terminal device may perform S1702.

S1702. The terminal device generates an alert tone based on the current scenario. Specifically, the terminal device may determine, based on a correspondence between a preset scenario and a preset scenario, alert tone control information corresponding to the current scenario, and generate the alert tone based on the alert tone control information corresponding to the current scenario.

The preset scenario is at least one of the following scenarios: incoming of a call, receiving of an SMS message, receiving of a WeChat message, receiving of a QQ message, and insufficient power. The current scenario is one of preset scenarios. The alert tone control information includes at least one of a frequency, a volume, a generation period, single playback duration, and a total quantity of playbacks that are of the alert tone.

S1703. The terminal device superposes the analog audio signal and the alert tone. Specifically, when determining that the current scenario is a scenario in which there is the alert tone playback requirement, the terminal device may determine, based on a correspondence between a preset scenario and superposed signal control information corresponding to the preset scenario, superposed signal control information corresponding to the current scenario, and superpose the analog audio signal and the alert tone based on the superposed signal control information corresponding to the current scenario.

For related descriptions of the superposed signal control information, refer to the foregoing descriptions. Details are not described herein again.

S1704. The terminal device plays the superposed analog audio signal and alert tone by using the headset connected to a headset jack. Specifically, the terminal device plays both the analog audio signal and the alert tone by using the headset connected to the headset jack.

For explanations, beneficial effects, and the like of related content in this embodiment, refer to the foregoing descriptions. Details are not described herein again.

Figure 18:
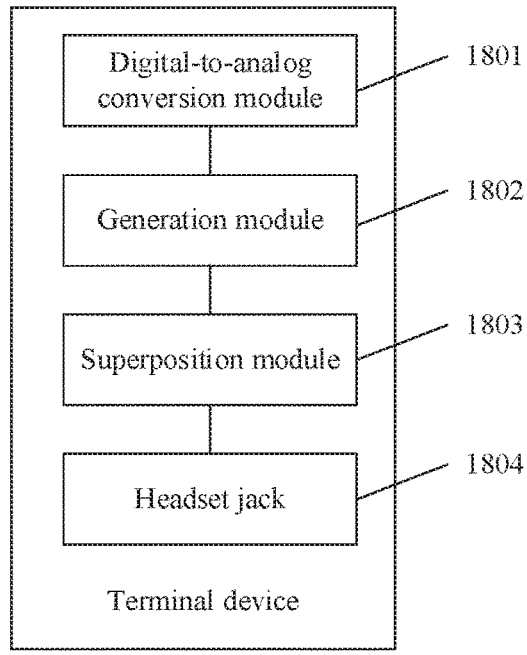
FIG. 18 is a schematic structural diagram 9 of a terminal device according to an embodiment of the present invention.

FIG. 18 is a schematic structural diagram of a terminal device according to an embodiment of the present invention. The terminal device is configured to perform the method shown in FIG. 17. The terminal device may include a digital-to-analog conversion module 1801, a generation module 1802, a superposition module 1803, and a headset jack 1804. The digital-to-analog conversion module 1801 is configured to convert a DSD audio signal into an analog audio signal. The generation module 1802 is configured to generate an alert tone based on a current scenario. The superposition module 1803 is configured to superpose the analog audio signal and the alert tone. The headset jack 1804 is configured to: connect to a headset, and send the superposed analog audio signal and alert tone to the headset, so that the terminal device plays the superposed analog audio signal and alert tone by using the headset. For example, with reference to FIG. 17, the digital-to-analog conversion module 1801 may be configured to perform S1701. The generation module 1802 may be configured to perform S1702. The superposition module 1803 may be configured to perform S1703.

In an example, the digital-to-analog conversion module 1801 may correspond to the foregoing digital-to-analog converter 204. The generation module 1802 may correspond to the foregoing generation unit 22. The superposition module 1803 may correspond to the foregoing first superposition unit 23. The headset jack 1803 may correspond to the foregoing headset jack 30.

It may be understood that the connection in the foregoing embodiment may be a direct connection, an indirect connection, a coupling connection, an electrical connection, and/or the like.

For explanations, beneficial effects, and the like of related content in this embodiment, refer to the foregoing descriptions. Details are not described herein again.

Persons skilled in the art should be aware that in one or more of the foregoing examples, functions described in this application may be implemented by hardware, or by hardware and software. When the functions are implemented by hardware and software, the functions may be stored in a computer readable medium or transmitted as one or more instructions or code in a computer readable medium.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A terminal device, comprising:
a processor configured to:
output a direct stream digital (DSD) audio signal in response to a trigger from a user;
and
generate alert tone control information corresponding to a current scenario;
a DSD audio playback circuit coupled to the processor, comprising:
a digital-to-analog converter configured to:
receive the DSD audio signal from the processor; and
perform digital-to-analog conversion on the DSD audio signal to obtain an analog audio signal; and
an alert tone output circuit coupled to the digital-to-analog converter, comprising:
a signal generator configured to generate an alert tone based on a reference signal and the alert tone control information; and
a superposition system coupled to the signal generator and configured to superpose the analog audio signal and the alert tone to form a superposed signal; and
a headset jack coupled to the DSD audio playback circuit and configured to connect to a headset to play the audio signal and the alert tone using the headset.

2. The terminal device of claim 1, wherein the processor is further configured to determine the alert tone control information by determining the alert tone control information based on a correspondence between a preset scenario and the alert tone control information.

3. The terminal device of claim 2, wherein the preset scenario comprises at least one of receiving an incoming call, receiving a short message service (SMS) message, receiving a WECHAT message, receiving a QQ message, or having insufficient power.

4. The terminal device of claim 2, further comprising a non-volatile memory coupled to the processor and configured to store the preset scenario and the alert tone control information.

5. The terminal device of claim 1, wherein the alert tone control information comprises at least one of a frequency, a volume, a generation period, a single playback duration, or a total quantity of playbacks of the alert tone.

6. The terminal device of claim 1, wherein the current scenario comprises at least one of receiving an incoming call, receiving a short message service (SMS) message, receiving a WECHAT message, receiving a QQ message, or having insufficient power.

7. The terminal device of claim 1, wherein the processor is an application processor.

8. The terminal device of claim 1, wherein the processor is further configured to determine the alert tone control information corresponding to a first preset scenario is different than the alert tone control information corresponding to a second present scenario.

9. The terminal device of claim 1, wherein the superposition system is configured to superpose the analog audio signal and the alert tone based on superposed signal control information from the processor, wherein the superposed signal control information corresponds to the current scenario.

10. The terminal device of claim 9, wherein the processor is further configured to determine the superposed signal control information by determining the superposed signal control information based on a correspondence between a preset scenario and the superposed signal control information.

11. The terminal device of claim 9, wherein the processor is further configured to determine the superposed signal control information corresponding to a first preset scenario is different than the superposed signal control information corresponding to a second present scenario.

12. A direct stream digital (DSD) audio playback method, comprising:
  receiving a DSD audio signal from a processor;
  converting the DSD audio signal into an analog audio signal;
  receiving a reference signal and alert tone control information from the processor, wherein the alert tone control information corresponds to a current scenario;
  generating an alert tone based on the reference signal and the alert tone control information;
  superposing the analog audio signal and the alert tone to form a superposed signal; and
  connecting to a headset to play the analog audio signal and the alert tone using a headset.

13. The DSD audio playback method of claim 12, further comprising determining, by the processor, the alert tone control information corresponding to the current scenario.

14. The DSD audio playback method of claim 13, further comprising determining the alert tone control information based on a correspondence between a preset scenario and the alert tone control information.

15. The DSD audio playback method of claim 12, further comprising:
  determining first alert tone control information that corresponds to a first preset scenario; and
  determining second alert tone control information that corresponds to a second present scenario, wherein the first alert tone control information is different than the second alert tone control information.

16. A direct stream digital (DSD) audio playback circuit, comprising:
  a digital-to-analog converter configured to perform digital-to-analog conversion on a DSD audio signal to obtain an analog audio signal; and
  an alert tone output circuit coupled to the digital-to-analog converter, comprising:
    a signal generator configured to generate an alert tone based on a reference signal and alert tone control information from a processor; and
    a superposition system coupled to the signal generator and configured to superpose the analog audio signal and the alert tone to form a superposed signal.

17. The DSD audio playback circuit of claim 16, wherein the alert tone control information corresponds to a current scenario.

18. The DSD audio playback circuit of claim 16, wherein the DSD audio playback circuit is configured to provide the superposed signal to a headset for playing.

19. The DSD audio playback circuit of claim 16, wherein the DSD audio playback circuit is a digital-to-analog converter chip.

20. The DSD audio playback circuit of claim 16, wherein the superposition system is configured to superpose the analog audio signal and the alert tone based on superposed signal control information, wherein the superposed signal control information corresponds to the current scenario.

* * * * *